United States Patent
Smith et al.

(10) Patent No.: US 9,534,146 B2
(45) Date of Patent: Jan. 3, 2017

(54) ADDITIVES FOR BITUMEN CONTAINING COMPOSITIONS

(75) Inventors: Mark Smith, Skepplanda (SE); Daniel Hagberg, Askim (SE)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 150 days.

(21) Appl. No.: 14/127,770

(22) PCT Filed: Jun. 21, 2012

(86) PCT No.: PCT/EP2012/061911
§ 371 (c)(1),
(2), (4) Date: Dec. 19, 2013

(87) PCT Pub. No.: WO2012/175586
PCT Pub. Date: Dec. 27, 2012

(65) Prior Publication Data
US 2014/0127399 A1    May 8, 2014

Related U.S. Application Data

(60) Provisional application No. 61/500,673, filed on Jun. 24, 2011.

(30) Foreign Application Priority Data

Jun. 24, 2011  (EP) .................................... 11171264
Jul. 5, 2011   (EP) .................................... 11172752

(51) Int. Cl.
| C09D 195/00 | (2006.01) |
| C08L 95/00 | (2006.01) |
| C08K 5/17 | (2006.01) |
| C08K 5/16 | (2006.01) |
| E01C 7/00 | (2006.01) |

(52) U.S. Cl.
CPC .............. *C09D 195/00* (2013.01); *C08K 5/16* (2013.01); *C08K 5/17* (2013.01); *C08L 95/00* (2013.01); *E01C 7/00* (2013.01); *C08L 2555/24* (2013.01); *C08L 2555/52* (2013.01); *C08L 2555/80* (2013.01)

(58) Field of Classification Search
CPC .................................. C09D 195/00; E01C 7/00
See application file for complete search history.

(56) References Cited

U.S. PATENT DOCUMENTS

| 3,615,797 A | 10/1971 | Ohtsuka et al. |
| 4,836,857 A | 6/1989 | Hopkins |
| 6,024,788 A | 2/2000 | Tomioka et al. |
| 6,451,885 B1 | 9/2002 | Dresin et al. |
| 7,670,420 B2 | 3/2010 | Ballie et al. |
| 7,732,511 B2 | 6/2010 | Barreto et al. |
| 2007/0082983 A1 | 4/2007 | Crews et al. |
| 2007/0119529 A1* | 5/2007 | Hobson ..................... C10L 1/10 149/1 |
| 2008/0060551 A1* | 3/2008 | Crews ................... C08L 95/005 106/277 |
| 2009/0203815 A1 | 8/2009 | Barreto et al. |
| 2010/0055304 A1 | 3/2010 | Reinke et al. |
| 2010/0192805 A1 | 8/2010 | Barreto et al. |
| 2010/0227954 A1 | 9/2010 | Naidoo et al. |
| 2011/0009533 A1 | 1/2011 | Gonzalez Leon et al. |
| 2011/0021673 A1 | 1/2011 | Reinke et al. |

FOREIGN PATENT DOCUMENTS

| DE | 218114 A1 | 1/1985 |
| EP | 0899006 A2 | 3/1999 |
| EP | 2062943 A1 | 5/2009 |
| EP | 2141204 A1 | 1/2010 |
| EP | 2166039 A1 | 3/2010 |
| EP | 1915420 B1 | 9/2010 |
| EP | 2251379 A1 | 11/2010 |
| FR | 2853647 B1 | 6/2006 |
| WO | WO 02/16488 A1 | 2/2002 |
| WO | WO 2007/112335 A2 | 10/2007 |
| WO | WO 2009/004044 A1 | 1/2009 |
| WO | WO 2009/013328 A1 | 1/2009 |
| WO | WO 2009/150369 A2 | 12/2009 |
| WO | WO 2010/092300 A1 | 8/2010 |

OTHER PUBLICATIONS

European Search Report dated Dec. 15, 2011 for Application No. 11171264.2-2115.
International Search Report and Written Opinion with a date of mailing of Sep. 11, 2012 for International Application No. PCT/EP2012/061911.
Zaumanis, Martin, Warm Mix Asphalt Investigation, Master of Science Thesis, Technical University of Denmark, Kgs.Lyngby, Denmark 2010.
Poskrobko et al., Oxythylation and Oxypropylation of Alcohols of Low Relative Molecular Mass in the Presence of Amine-Type Catalysts, 2000 J. Chem. Technol. Biotechnol, Poland.
Syzmanowski, Oxyethylation and Oxypropylation of Low Molecular Alcohols, Ind. Eng. Chem. Res. 1999, 38, 2225-2230, published on Web Apr. 29, 1999.
Machine Translation Abstract of DD218114A1, Date: Jan. 30, 1985.

\* cited by examiner

*Primary Examiner* — Ling Choi
*Assistant Examiner* — Lanee Reuther
(74) *Attorney, Agent, or Firm* — Nirav P. Patel

(57) ABSTRACT

The present invention relates to a composition comprising bitumen and an alkoxylated amine, to a method for the production of such a composition, and to a method for paving a surface using such a composition. The present invention also relates to an preformulated additive package to be added to bitumen, comprising an alkoxylated amine and an anti-stripping agent.

15 Claims, No Drawings

ADDITIVES FOR BITUMEN CONTAINING COMPOSITIONS

This application is a National Stage entry of International Application PCT/EP2012/061911, filed Jun. 21, 2012, which claims the benefit of U.S. Patent Application No. 61/500,673, filed Jun. 24, 2011, European Patent Application No. 11171264.2, filed Jun. 24, 2011, and European Patent Application No. 11172752.5, filed Jul. 5, 2011. The contents of the aforementioned applications are incorporated herein by reference in their entireties.

TECHNICAL FIELD OF INVENTION

The present invention relates to a composition comprising bitumen and an alkoxylated amine, to a method for the production of such a composition, and to a method for paving a surface using such a composition. The present invention also relates to a preformulated additive package to be added to bitumen, comprising an alkoxylated amine and an anti-stripping agent.

TECHNICAL BACKGROUND OF THE INVENTION

Bitumen is a key ingredient for pavement, roofing and waterproofing applications. A primary use of bitumen is in pavement applications, such as road construction. At ambient temperature, bitumen is an essentially solid material, but at elevated temperatures, the bitumen is a flowing fluid. In e.g. road construction, a mixture of bituminous binder and aggregates, such a divided rock material, i.e. an asphalt composition, is laid down on a bedding to produce a wear resistant paving.

One common method of paving is commonly referred to as the hot-mix method, wherein heated bituminous binder is mixed with aggregates to produce a hot, flowing asphalt composition. The bituminous binder is heated to a temperature at which it is fluid enough to properly cover the aggregates. The aggregates are typically heated prior to the mixing with the bituminous binder, on the one hand to obtain proper evaporation of their moisture, and on the other hand to maintain a suitable temperature of the asphalt composition during and after the mixing.

The asphalt composition is then kept at an elevated temperature during transportation to the site of use and until it is laid down as a layer on the ground to secure suitable workability of it, and is then compacted before cooling down to ambient temperatures. Once the compacted layer has cooled down, the surface is ready to use.

The use of elevated temperatures in the mixing, transportation, lay-down and compacting steps is energy consuming and causes fume emissions of volatile hydrocarbons from the bituminous binder.

There is thus a need for reducing the temperature in the aggregate-mixing, transportation, lay down and compaction steps, while at the same time achieving the desired air void content and density of the finished paved surface.

This may be achieved by adding one or more additives to the bitumen, which results in a bituminous binder with a maintained workability at a lower temperature compared to the bitumen without such additives. Such additives have been referred to as warm-mix additives, as they allow a lowering of the various process temperatures from what is referred to in the industry as "hot" to what is referred to in the industry as "warm".

Lowering the process temperatures by adding such warm-mix additives would reduce the energy consumption, would allow for longer haul distances, as the mix, at a lower temperature will maintain a workable rheology when it reaches the construction site, thereby extending the paving season, as it may allow paving to be performed at lower ambient temperatures. Lower processing temperatures may also reduce oxidative hardening of the bitumen, thereby extending the pavement life.

Several processes and products are being introduced into the market to reduce compaction and mixing temperatures.

For instance, EP 2 166 039 A1 to Ceca S. A. relates to methods for the production of asphalt mixtures by using a bituminous composition that has been stored for a given period of time and which composition comprises at least one bitumen and at least one additive that allows asphalt mixture production at reduced temperatures.

However, moisture damage of the pavement is of great concern, and can occur by two major pathways. First, water will displace the bituminous binder from the aggregate surface, especially the ones containing higher amounts of silica, as water has a higher affinity for the aggregate surface compared to the bitumen, and as there is a lack of chemical bonding of bitumen to the aggregate surface. This deleterious process is known as stripping. Secondly, water, over a period of time and under a repeated load can get inside the bitumen and reduce the cohesive strength of the bituminous binder.

Further, the use of the prior art warm-mix additives in the bitumen typically causes a loss of the stiffness modulus of the eventual pavement.

There is still a need in the art to provide additives that on the one hand lowers the temperatures at which the bituminous binder and the asphalt composition can be processed, and that on the other hand provides improved anti-stripping properties, reduces the loss of cohesive strength, and reduces the loss of stiffness modulus commonly associated with such additives.

SUMMARY OF THE INVENTION

It is an object of the present invention to overcome at least part of the problems of the prior art.

One object is thus to provide an additive that lowers the minimum temperature at which compositions containing bitumen can be processed. Important processing steps, in which the lowering of the minimum temperature is advantageous include, but are not limited to the step of mixing the bituminous binder with aggregates to form an asphalt composition, the step of laying down the asphalt composition, and the step of compacting the laid down asphalt composition.

Another object is to provide an additive that while it lowers the processing temperatures of the bituminous binder and the asphalt composition, it also provides to the asphalt composition improved anti-stripping properties and/or reduces the loss of cohesive strength and/or provides an asphalt composition with a high stiffness modulus.

The present inventors have surprisingly found that these objects can be met by using certain alkoxylated amines as an additive to bitumen.

DETAILED DESCRIPTION OF THE INVENTION

The present invention relates in general to the use of compounds according to formula (I), acid salts thereof, or the resulting compound from reacting a compound of formula (I) with a quaternizing agent, in bitumen containing compositions, wherein formula (I) is as follows:

(I)

wherein
each one of $R^1$, $R^2$ and $R^3$ is independently selected from $C_{1-24}$ hydrocarbyl, a group $C_{1-24}$ hydrocarbyl-$N(R^4)$—$(CH_2)_n$—, benzyl, and a group —$(CH_2CH_2O)_p(CH_2CH(X)O)_q(CH_2CH_2O)_rR^5$;
$R^4$ is methyl, ethyl or benzyl or a group —$(CH_2CH_2O)_p(CH_2CH(X)O)_q(CH_2CH_2O)_rR^5$;
$R^5$ is independently H, —$R^6$ or —$C(O)R^6$, where $R^6$ is a $C_{1-6}$ hydrocarbyl, such as methyl or ethyl. $R^5$ is preferably H;
n is a value of from 2 to 4, preferably 3;
X is methyl or ethyl, preferably methyl;
$\Sigma p$ is a value of from 0 to 100, preferably to 80, more preferably to 60, most preferably to 50;
$\Sigma q$ is a value of from 10 preferably from 20, more preferably from 30, most preferably from 40 to 100, preferably to 80, more preferably to 60, most preferably to 50;
$\Sigma r$ is a value of from 0 to 100, preferably to 80, more preferably to 60, most preferably to 50;
with the proviso that
at least one of $R^1$, $R^2$ and $R^3$ is —$(CH_2CH_2O)_p(CH_2CH(X)O)_q(CH_2CH_2O)_rR^5$;
at most two of $R^1$, $R^2$ and $R^3$ is $C_{1-24}$ hydrocarbyl, a group $C_{1-24}$ hydrocarbyl-$N(R^4)$—$(CH_2)_n$, or benzyl; and
at least one of $\Sigma p$ and $\Sigma r$ is $\geq 10$, preferably $\geq 20$, more preferably $\geq 30$.

In compounds of formula (I), $\Sigma p+\Sigma r$ is preferably from 10, more preferably from 20, most preferably from 30, to 200, more preferably to 100, even more preferably to 60, most preferably to 40.

In certain embodiments, $\Sigma r$ is 0. In other embodiments, $\Sigma p$ is 0. In further other embodiments, each one of $\Sigma p$ and $\Sigma r$ is $\neq 0$. In preferred embodiments, $\Sigma p$ is $\neq 0$.

The use of "$\Sigma$" in the structural formulas herein shall be interpreted and read as meaning "the sum of all instances of". In this context, "$\Sigma q$" means the sum of all instances of q in the structural formula, i.e. the total number of ($CH_2CH(X)O$)-groups in each molecule. Analogous interpretations are to be made regarding the interpretation of "$\Sigma p$" and "$\Sigma r$".

As will be further described below with reference to more specific examples, the compounds of formula (I) is typically obtained by subjecting an amine precursor molecule to a series of alkoxylation reactions, whereby ($CH_2CH_2O$) and/or ($CH_2CH(X)O$) groups are added to the amine precursor molecule to form the desired compound of formula (I). As is well known to those skilled in the art, such alkoxylation reactions results in the formation of homologues with different amounts of the respective alkyleneoxy groups added. In this respect, $\Sigma p$ represents the number of moles of ethylene oxide (EO) reacted per mole of amine precursor molecule to obtain the ($CH_2CH_2O)_p$-stretch, $\Sigma q$ represents the number of moles of propylene oxide (PO) or butylene oxide (BO) reacted per mole of amine precursor molecule to obtain the ($CH_2CH(X)O)_q$-stretch, and $\Sigma r$ represents the number of moles of EO reacted per mole of amine precursor molecule to obtain the ($CH_2CH_2O)_r$-stretch.

In compounds of formula (I), $C_{1-24}$ hydrocarbyl preferably is a branched or linear, saturated or unsaturated alkyl group containing from 1, for example from 2, to 24, for example to 12, such as to 6 carbon atoms. Examples of $C_{1-24}$ hydrocarbyl groups for use in compounds of formula (I) include, but are not limited to methyl, ethyl, propyl, benzyl, pentyl, hexyl, octyl, decyl, dodecyl, and the hydrocarbyl group of naturally occurring fatty acids, such as, but not limited to the hydrocarbyl group of rapeseed oil, tallow, tall oil, coconut oil and cocoa butter In a first embodiment, in the compounds of formula (I), each one of $R^1$, $R^2$ and $R^3$ is independently a group —$(CH_2CH_2O)_p(CH_2CH(X)O)_q(CH_2CH_2O)_rR^5$. Examples include compounds in which X is methyl, $R^5$ is H, $\Sigma p$ is from 20 to 80, such as about from 30 to 60, $\Sigma q$ is from 10 to 80, such as from 20 to 60, and $\Sigma r$ is 0.

Such compounds may e.g. be obtained by using triethanolamine as a starting material (the amine precursor molecule), ethoxylate the starting material with $\Sigma p$-3 moles of ethylene oxide (EO) per mole of starting material, propoxylate or butoxylate with $\Sigma q$ moles of propylene oxide (PO) or butylene oxide (BO) per mole of starting material, respectively, and then again ethoxylate with $\Sigma r$ moles of EO per mole of starting material. A catalyst should be used in all the alkoxylation steps. This catalyst is typically an alkali metal hydroxide, such as NaOH or KOH.

In a second embodiment, in the compounds of formula (I), $R^1$ is $C_{1-24}$ hydrocarbyl and each one of $R^2$ and $R^3$ is independently a group —$(CH_2CH_2O)_p(CH_2CH(X)O)_q(CH_2CH_2O)_rR^5$. Examples include compounds in which the $C_{1-24}$ hydrocarbyl is a $C_{1-6}$ alkyl, such as butyl, X is methyl, $R^5$ is preferably H, $\Sigma p$ is from 20 to 80, such as about from 30 to 60, $\Sigma q$ is from 10 to 80, such as from 20 to 60, and $\Sigma r$ is 0.

Such compounds may e.g. be produced by using an alkylamine having 1 to 24, preferably 1 to 6 carbon atoms, such as methylamine, ethylamine, propylamine, butylamine, pentylamine or hexylamine, as starting material (the amine precursor molecule). This alkylamine is first (if p is at least 2) ethoxylated with 2 moles of EO per mole of the starting material without any catalyst present, and then further ethoxylated with $\Sigma p$-2 moles of EO per mole of starting material, typically using an alkali metal hydroxide as catalyst. In the next step this intermediate is propoxylated or butoxylated with $\Sigma q$ moles of PO or BO, respectively, per mole of starting material using the same catalyst as was used for the ethoxylation. Finally the product is again ethoxylated with $\Sigma r$ moles of EO per mole of starting material, using the same catalyst as used previously.

In a third embodiment, in the compounds of formula (I), $R^1$ is a $C_{1-24}$ hydrocarbyl, $R^2$ is a $C_{1-24}$ hydrocarbyl or a benzyl, $R^3$ is a group —$(CH_2CH_2O)_p(CH_2CH(X)O)_q(CH_2CH_2O)_rR^5$ where X is methyl.

Such compounds may be produced by using a dialkylamine having 1-24 carbon atoms, such as dimethylamine, diethylamine, dipropylamine, dibutylamine, di(coco alkyl)amine or N-methyl-N-(coco alkyl)amine, or an alkylbenzylamine, such as N-methyl-N-benzylamine, N-ethyl-N-benzylamine, N-isopropyl-N-benzylamine or N-benzyl-N-(coco alkyl)amine as starting material (the amine precursor molecule). This starting material is then ethoxylated with p moles of EO per mole of starting material, then propoxylated or butoxylated with q moles of PO or BO, respectively, per mole of starting material and then ethoxylated again with r moles of EO per mole of starting material. In all alkoxylation steps a catalyst is used, such as an alkali metal hydroxide. Alternatively, the first mole of EO might be added without a catalyst.

Quaternizing agents to react with a compound of the formula (I) include any quaterizing agents known to those skilled in the art, such as, but not limited to, alkyl or benzyl halides, typically methyl chloride, ethyl chloride or benzyl chloride; or dialkyl sulfates, preferably dimethyl sulfate and diethyl sulfate.

Reaction of a compound of formula (I) with a quaternizing agent, also referred to as quaternisation of a compound of formula (I), results in part or all of the nitrogen atoms in the compound of formula (I) being quaternized by attachment of the quaternizing agent to the nitrogen atom, such as according to the well known Menschutkin reaction.

Suitable reaction conditions for the quaternisation of a compound of formula (I) are evident to person skilled in the art.

In the different aspects of the present invention, however, the compound of formula (I) is preferably not reacted with a quaternizing agent.

The non-quaternized compound of formula (I) may be present in the form of the free amine, or may be present in the form of an acid salt of the compound of formula (I). Acids present in compositions of the invention, and forming acid salt with the compound of formula (I) may be any acid, such as mineral acids, organic acids or mixtures thereof. The compounds of formula (I) may be added to bitumen in acid salt form or may form the acid salt in situ by neutralization with acids present in the bitumen. Non-limiting examples of acid salts of the compound of formula (I) include hydrochloric acid, sulphuric acid, phosphoric acid, polyphosphoric acid, formic acid and acetic acid salts. From here on, the compound of formula (I), the acid salts thereof as well as the resulting compound from reacting a compound of formula (I) with a quaternizing agent are collectively referred to as "optionally quaternized compound of formula (I)".

Bitumen (in North America also referred to as "asphalt") is one of the heavier, if not the heaviest, portions from the oil distillation process. Due to the different origins and distillation processes of such oils, the resulting bitumen may have a wide range of properties and characteristics.

As used in the present invention, the term "bitumen" refers not only to the product from oil by direct distillation or from distillation of oil at reduced pressures, but also to the product resulting from the extraction of tar and bituminous sands, the product of oxidation and/or fluxation of such bituminous materials, as well as blown or semi-blown bitumens, synthetic bitumens (such as described in FR 2 853 647-A1), tars, oil resins or indene-coumarone resins mixed with aromatic and/or paraffinic hydrocarbons, chemically modified bitumen, such as polymer modified bitumen and/or acid modified bitumen, and mixtures thereof.

So-called cut-back bitumens, i.e. bitumens diluted with a petroleum solvent, such as e.g. naphtha, kerosene and/or diesel to lower their viscosity, are also within the definition of "bitumen" as used herein. However, preferred bitumens for use in the present invention are those comprising at most 5 wt %, preferably at most 4 wt % of petroleum solvents, such as naphtha, kerosene and/or diesel.

Bitumens especially contemplated for use in the present invention are those having an API density (American Petroleum Institute) of at most 10, and/or a penetration value (pen) of from 10 to 430 dmm (tenths of millimetres) at 25° C., measured according to AASHTO T 49 and ASTM D 5: Penetration of Bituminous Materials.

Bitumen may comprise minor amounts of water dispersed therein. Preferably, bitumen contemplated for use in the present invention comprises less than 10, preferably less than 5, most preferably less than 1 wt % water, and is typically essentially anhydrous. In compositions of the present invention, the bitumen is preferably not present in the form of a bitumen-in-water emulsion, and the composition is not a bitumen-in-water emulsion.

In one aspect, the present invention relates to a composition comprising a) bitumen and b) an optionally quaternized compound of formula (I).

A composition of the present invention may further comprise c) at least one anti-stripping agent being a compound that is different from that of formula (I), hereinafter "anti-stripping agent", such as those commonly used in the field of bitumen and asphalts.

While the bitumen is a highly hydrophobic material, the surface of the aggregates are typically hydrophilic. An anti-stripping agent, also sometimes referred to as adhesion agent, may therefore be needed as it promotes the adhesion of bitumen to the aggregates and prevents the stripping of bitumen from the aggregates.

Non-limiting examples of anti-stripping agents used in the art include phosphated surfactants, sulfonated surfactants, alkyl carboxylic acids, fatty acid esters of quaternary alkanol amines, fatty amines, fatty polyamines, ethoxylated fatty amines, ethoxylated fatty polyamines, alkyl amido polyamines, alkyl imidazolines, alkyl imidazoline amines and alkyl imidazoline polyamines, the products from the reaction between polyamines and fatty carboxylic acids, the products from the reaction between fatty acids, vegetable oil or animal oil and diethanolamine followed by the reaction with polyamines.

It is well known that the choice of anti-stripping agent depends on the choice of aggregates, as the chemical structure of the anti-stripping agent needs to be tailored to the surface properties of the aggregates.

In embodiments of the present invention, the anti-stripping agent is a nitrogen containing anti-stripping agent. It has been shown that nitrogen containing anti-stripping agents are useful in combination with silicious aggregates.

Alkyl imidazolines, alkyl imidazoline amines and alkyl imidazoline polyamines, where "alkyl" represents a straight or branched, saturated or unsaturated alkyl group with from 6, such as from 8, for example from 12 to 30, such as to 24 carbon atoms are currently preferred, especially in combination with aggregates comprising siliceous material. Examples include alkyl imidazoline ethyleneamine, alkyl imidazoline diethylenediamine, alkyl imidazoline triethylenetriamine and alkyl imidazoline tetraethylenetetraamine. Tallow-imidazoline-triethylenetriamine is a representative example of an amine containing anti-stripping agent contemplated for use in the present invention.

Preferably, the optionally quaternized compound of the formula (I) and the optional anti-stripping agent are added to the bitumen at a bitumen temperature of from 100, more preferably from 130, to 260, more preferably to 200° C. This temperature is dependent on the grade of bitumen used in the composition. Generally, a bitumen with a lower penetration value requires a higher temperature compared to a bitumen of a higher penetration value to reach a desired viscosity at which the mixing can be efficiently performed.

The b) optionally quaternized compound of formula (I) and the c) anti-stripping agent, if present, are preferably added to the a) bitumen to ratio (a):(b+c) of from 99.9:0.1, more preferably from 99.8:0.2 and most preferably from 99.7:0.3 to 95:5, more preferably to 98:8 and most preferably to 98.5:1.5.

The optionally quaternized compound of formula (I) and the anti-stripping agent may be preformulated to an additive package before addition to the bitumen, or may be added simultaneously or separately from each other in any order.

When the anti-stripping agent is present, the weight ratio between the optionally quaternized compound of formula (I) and the anti-stripping agent is from 95:5, preferably from 80:20, more preferably from 60:40, most preferably from 55:45 to 5:95, preferably to 20:80, more preferably to 40:60, most preferably to 45:55, such as about 50:50.

A preformulated additive package comprising the optionally quaternized compound of formula (I) and the anti-stripping agent at the above specified ratios represents a separate aspect of the present invention. Preferably, the optionally quaternized compound of formula (I) and the anti-stripping agent together constitutes at least 10, such as at least 50, more preferably at least 75, most preferably at least 90 wt % of such a preformulated additive package. Additional components in such preformulated additive package may for example include suitable solvents, stabilizers and compatibility agents.

The preformulated additive package preferably comprises less than 10, more preferably less than 5 wt % bitumen. Most preferably, the preformulated additive package is free from bitumen.

In preferred embodiments, the premixed preformulated additive package is a liquid at ambient temperatures, and preferably has a melting temperature at or below 0, more preferably at or below −10, most preferably at or below −20° C.

The preformulated additive package is further preferably essentially insensitive to freeze-thawing cycles, in that no component of the formulation precipitates if it is subjected to one or more freeze-thaw cycles where the temperature of the formulation is brought from 25° C. to −20° C. and back to 25° C.

In currently preferred embodiments, the optionally quaternized compound of formula (I) is a non-quaternized compound, in the form of the free amine or as an acid salt, in which the $C_{1-24}$ hydrocarbyl is a $C_{1-6}$ alkyl, such as butyl, $\Sigma p$ is from 30 to 40, such as about 35, $\Sigma q$ is from 40 to 50, such as about 45, and $\Sigma r$ is 0, and the anti-stripping agent is an alkyl imidazoline polyamine, where alkyl represents a $C_{8-24}$ straight alkyl, such as tallow-imidazoline triethylenetriamine. Such a formulation is, in the absence of additional components, liquid at temperatures down to 5° C. and below, and remains a clear liquid when subjected to a freeze-thaw cycle as described above.

A composition of the present invention, comprising bitumen, the optionally quaternized compound of the formula (I) and, optionally, an anti-stripping agent represents a bituminous binder composition that when further mixed with aggregates forms an asphalt composition of the invention that is ready to use in paving applications.

As used herein, the term "bituminous binder" refers to a composition comprising bitumen and additives, but not aggregates. A composition of the present invention, comprising bitumen, an optionally quaternized compound of formula (I) and optionally anti-stripping agent, but no aggregates, is a bituminous binder composition according to the present invention. The bituminous binder of the present invention is preferably not a bitumen-in-water emulsion, and comprises preferably less than 10 wt %, more preferably less than 5, less than 4, less than 3, less than 2 or less than 1 wt % water, based on the total weight of a), b) and c) in the composition, and it may even be essentially anhydrous.

As used herein, the term "asphalt composition" refers to a composition comprising a bituminous binder and aggregates, and includes compositions known in the art as asphalt concrete and mastic asphalt.

In an asphalt composition of the present invention, the aggregates are preferably added to a final aggregate concentration of from 75, more preferably from 80, even more preferably from 88 and most preferably from 90 to 99, more preferably to 98 and most preferably to 95 wt %, based on the total weight of the asphalt composition.

As used herein, the term "aggregate" relates to divided materials from quarries, stone material, bituminous mix aggregates, such as from reclaimed asphalt, milled fragments, clinker, scoria, slag and concrete.

In compositions known in the art as asphalt concrete compositions, the mean size of the aggregates is typically less than 5, preferably less than 3 cm in any dimension, and typically has a mean size of at least 0.1 cm, preferably at least 0.3 cm in at least one dimension. It is however to be recognized that the aggregates often comprises a portion of filler particles, which are finely divided materials having a particle size of below 75 μm.

In embodiments of the present invention, the aggregates comprise siliceous material. For example, the aggregates may emanate from a silicate mineral containing rock, such as, but not limited to granite, diabase, dolerite and basalt.

Prior to addition, the aggregates are typically heated to a temperature suitable to evaporate at least part of any moisture of the aggregates, resulting in essentially dry aggregates being added to the bituminous binder composition of the invention. The temperature of the aggregates at addition to the bituminous binder composition is typically chosen such that the resulting mixture has a desired fluidity. The temperature of the aggregates at which they are mixed with the bituminous binder is typically from 90, preferably from 120, to 210, preferably to 150° C. The temperature of the bituminous binder composition just prior to the mixing with the aggregates is typically from 100, preferably from 130, to 200, preferably to 180° C.

Bitumen, the optionally quaternized compound of formula (I), the anti-stripping agent different from a compound of formula (I), if present, and the aggregates preferably together constitutes at least 80, more preferably at least 90, most preferably at least 95, for example 100 wt % of the total asphalt composition.

In embodiments of the invention, bitumen, the optionally quaternized compound of formula (I) and the anti-stripping agent, if present, together constitutes at least 50, more preferably at least 80, most preferably at least 90, or even 100 wt % of the bituminous binder composition.

Other common components in asphalt mixtures are organic and inorganic fibres, such as glass, metal or carbon fibres, as well as resins, cellulose, cotton, polymers, such as polypropylene, polyester and polyvinyl alcohol, polyamide fibres, and the like.

A composition of the present invention as defined above, comprising a) bitumen, b) optionally quaternized compound of formula (I), optionally c) an anti-stripping agent, and d) aggregates may be used to pave a surface, such as, but not limited to a road, a sidewalk, an airfield runway and the like by laying down, on a surface, such as a suitably prepared bedding, a layer of the composition, the "asphalt layer", at an elevated temperature, preferably from 60, more preferably from 80 to 160, more preferably to 120° C., preferably compacting the asphalt layer at a composition temperature of from 70 to 120° C., and thereafter allowing the asphalt layer to cool to ambient temperature.

The step of compacting is performed if needed to achieve the desired air void content (i.e. the desired density of the asphalt layer). The air void content of the final asphalt layer, after cooling, is typically from 0 to 10 vol % as measured according to British Standard EN 12697-8:2003. However, in so-called open asphalt, the desired air void content of the final asphalt layer may be up to 30 vol %.

By adding the optionally quaternized compound of formula (I), optionally in combination with the anti-stripping agent, to the bitumen thereby obtaining a bituminous binder composition of the invention, the minimum temperatures in the different process steps, such as mixing with aggregates, storage, transportation, lay down, and compacting can be lowered while maintaining a workable rheology of the compositions, compared to when using bitumen without any such additives. Further, and as will be shown in below in the experimental section, the optionally quaternized compound of formula (I), optionally in combination with the anti-stripping agent, provides anti-stripping effects to the bitumen, provides a cohesive strength improving effect, reduces the loss of cohesive strength connected to the subjection to wear and water, and reduces the loss of stiffness modulus commonly

EXAMPLES

The present invention will now be further described by means of the following illustrative examples. In the examples, the following materials were used:

Bitumen

The bitumen used in the Examples was a bitumen with a penetration value of from 70 to 100 dmm (70/100 pen) and an acid value of 0.51 mg KOH/g, obtained from Shell, Hamburg, Germany.

Chemical Additives n-butylamine+35EO+45PO ex Akzo Nobel Surface Chemistry AB, Sweden (compound according to formula (I), where $R^1$ is n-butyl, $R^2$ and $R^3$ are —$(CH_2CH_2O)_p(CH_2CH(CH_3)O)_qH$+Σp is 35 and Σq is 45)

Redicote 404: Tall oil-imidazoline triethylenetriamine ex Akzo Nobel Surface Chemistry AB, Sweden Pluronic PE9200: polyethyleneglycol-block-polypropyleneglycol-block-polyethyleneglycol co-polymer ex BASF, Germany Asphalt Mix Design An asphalt mixture was created following the recommendations given in Vägverkets (The Swedish Transport Administration) Teknisk beskrivningstext (VVTBT), Bitumenbundna lager—Publication 2008:113

The material chosen for these experiments was a 16 mm nominal size Asphaltic concrete according to paragraph 3.1.1.2, ABT16 in the above mentioned publication.

Aggregates

The aggregates used in the examples were crushed granite from Swerock-Fröland quarry, Uddevalla, Sweden, with a size distribution of from 0-16 mm fractionated into various sizes.

Table 1 below shown below shows the grading chosen for the experiments and its compliance to the referred specification. The mix was identified as ABT16

TABLE 1

Aggregate size fractionation

| Seive mm | % Retained | % passing | VVTBT 2008:113 - 3.1.1.2.1 Specification |
|---|---|---|---|
| 31.5 | 0.0 | 100.0 | 100 |
| 22.4 | 0.0 | 100.0 | 100 |
| 16 | 1.8 | 98.2 | 90-100 |
| 11.2 | 17.7 | 80.5 | 71-88 |
| 8 | 14.9 | 65.6 | 57-73 |
| 5.6 | 12.2 | 53.5 | 47-64 |
| 4 | 12.0 | 41.5 | 39-58 |
| 2 | 13.8 | 27.7 | 26-47 |
| 1 | 7.0 | 20.7 | 18-38 |
| 0.5 | 5.4 | 15.3 | 13-30 |
| 0.25 | 4.5 | 10.7 | 10-22 |
| 0.125 | 2.7 | 8.0 | 8-15 |
| 0.075 | 2.2 | 5.9 | 6-9 |

Asphalt Sample Manufacturing

Aggregate fractions were weighed out according to the ABT16 mix design to a total sample size of 30 kg. The aggregate samples were heated to 140° C. for 24 hours before using in the laboratory preparation of the asphalt samples.

Bitumen was heated to 165° C. in an oven and measured out to a calculated mass equivalent to 5.6% of the aggregate weight. When additives were used in the asphalt material, the additive was added to the heated bitumen as a weight percentage of the bitumen weight and stirred into the bitumen for 1 minute. The bitumen preparations were then placed back in the oven until it had returned to the 165° C. desired temperature.

When the materials were at the desired temperatures, the aggregate was first placed into the asphalt mixer (Scantech 30 kg horizontal shaft "pug-mill" asphalt mixer), also conditioned at 140° C. for 24 hours prior to use, followed by the bitumen, and mixed according to the timeline outlined in Table 2

TABLE 2

Description of asphalt mixing procedure

| Action | Mixing Time line | |
|---|---|---|
| Mixing with dry aggregate only | 5 sec. | |
| Add bitumen | 15 sec. | |
| "wet" mixing time | | 40 seconds |
| Total mixing time | 60 seconds | |

The resulting asphalt mixture was discharged into a tray underneath the mixer and then conditioned at 135° C. for 4 hours in a thermostatically controlled—forced ventilation oven before further processing in accordance to the guidelines and recommendations stated in the Asphalt Institute Superpave design guidelines (Asphalt Institute Superpave Level 1 Mix Design Superpave series No. 2 (SP-2)).

The following asphalt mixtures were produced:

TABLE 3

Description of asphalt mixtures

| Number | Aggregate & Bitumen | Additive in Binder (wt %) |
|---|---|---|
| 1a | ABT16 + 5.6 wt % Binder | 0.3% n-butylamine + 35EO + 45PO 0.3% Redicote 404 |
| 1c (comparison) | ABT16 + 5.6 wt % Binder | 0.3% BASF Pluronic PE 9200 0.3% Redicote 404 |
| 1d (comparison) | ABT16 + 5.6 wt % Binder | No Additive |
| 1e | ABT16 + 5.6 wt % Binder | 0.3% n-butylamine + 35EO + 45PO |
| 1f (comparison) | ABT16 + 5.6 wt % Binder | 0.3% Redicote 404 |
| 1g (comparison) | ABT16 + 5.6 wt % Binder | 0.3% BASF Pluronic PE 9200 |

Compaction Methods

Two individual methods of compaction were used to create the test samples.

Method 1—Roller Sector Compactor

Asphalt slabs were made by using an Infratest 20-4030 Roller Sector Compactor 30 kN and prepared according to EN 12697-33 2004+A1—2007, The Asphalt slabs measured 320 mm by 260 mm by approximately 67 mm (depending on achieved density) and weighed 12 kg. The compaction of the asphalt slabs was to a set compaction force and sequence as described in Table 4.

TABLE 4

Roller Sector Compactor apparatus set-up

| Number of roller passes | Load | Rate of load |
|---|---|---|
| 10 | 0-3 kN | 0.3 kN/pass |
| 5 | smoothing at constant 3 kN load | |
| 10 | 3 kN to 8 kN | 0.5 kN/pass |
| 5 | smoothing at constant 8 kN load | |
| 1 | 8 kN to 15 kN | 1 kN/pass |
| Release load | 15 kN to 0 kN | −1 kN/pass |

Method 2—Gyratory Compactor

Asphalt tablets were made by using a Cooper Technology GYROCOMP (1996) and prepared according to EN12697-31:2007 (gyro compaction). The Asphalt samples measured 150 mm diameter and a thickness of 67 mm (depending on achieved density) and weighed 2.5 kg. The compaction of the asphalt tablets was to a set compaction force, angle, and number of gyrations as described in Table 5

TABLE 5

Gyratory compactor apparatus set-up

| Compaction variable | Value |
|---|---|
| Gyrations per minute | 30 |
| Compaction angle | 1.25° |
| Compaction pressure | 60 Mpa |
| Total gyrations | 200 |

Compactability Measurements

Compactability Effect via Densification

The compactability of the test samples could be judged by assessing their densities achieved during a compaction sequence.

The samples described in Method 1—Roller Sector Compactor were all compacted at 100° C. This temperature was achieved by allowing the asphalt to cool from the conditioning temperature of 135° C. to the suggested warm-mix compaction temperature of 100° C.

By using the data obtained during the compaction sequence it can be seen that material (1a) containing the inventive additive, achieved a lower air void content compared to the comparison materials 1d and 1c. These results are shown in table 6 below. A lower air void content indicates an improved compactability.

TABLE 6

Asphalt compaction data from plate compactor

| Material | Sample height (mm) | Density (g/dm³) | Air Voids (vol %) |
|---|---|---|---|
| 1a | 68.75 | 2324 | 3.1 |
| 1c (comparison) | 69.11 | 2313 | 3.6 |
| 1d (comparison) | 70.23 | 2280 | 5.1 |

Compactability Performance of Additive Components

Asphalt tablets were made using the method described in Method 2—Gyratory Compaction. Individual chemical components were assessed for their compactability effect by reviewing densities achieved at different temperatures.

There were four different asphalt mixtures made and three samples were made for each data point at each temperature, and the densities after 200 gyrations are shown in table 7.

The test temperature was obtained by first placing the 2.5 kg sample into the preheated moulds and then placing the un-compacted samples into an oven preheated at the test temperature for 3 hours. At the end of the 3 hours, the moulds were removed from the oven and immediately transferred to the gyratory compaction and the compaction sequence started.

TABLE 7

Asphalt densification data from gyratory compactor

| Compaction Temperature | (1d) comparison | (1e) | (1f) comparison | (1g) comparison |
|---|---|---|---|---|
| | Sample density after 200 gyrations (g/dm³) | | | |
| 140° C. | 2170 | 2186 | 2170 | 2181 |
| 120° C. | 2142 | 2194 | 2175 | 2155 |
| 100° C. | 2140 | 2175 | 2150 | 2146 |
| 80° C. | 2135 | 2132 | 2145 | 2124 |

From table 7 it is evident that when compacting is performed at temperatures that in the industry are referred to as "warm" temperatures, i.e. at 100-120° C., the invention provides an increased sample density, indicating an improved compactability at these temperatures.

Performance Properties Measurements

To test for void content, ITS (indirect tensile strength), ITSR (indirect tensile strength ratio) and Stiffness Modulus, test cores were obtained by drilling 100 mm cores from slabs made by the Method 1—Roller Sector Compactor. The results are shown in Table 8. Density and void content was obtained by using the data from calculations in Swedish Standards (FAS metoder—Framtagna av Föreningen för Asfaltbeläggningar i Sverige)
   FAS 412-98 Determination of theoretical maximum density pycnometer,
   FAS 413-97 Calculation of air voids content and
   FAS 425-00 Determination of theoretical maximum density.

Resistance to wheel track deformation was tested at 50° C. in air in accordance with
   EN 12697-22 Wheel Tracking—6.3 small size devices Stiffness Modulus was first determined on the samples, followed by Indirect Tensile Strength testing. ITSR was used to examining the performance/resistance to degradation from the ingress of water into an asphalt material/structure. Tests were performed on dry specimens, and compared to the same results from wet conditioned specimens.

Testing to Swedish standard involves (but is not limited to) one set of cores to be conditioned in water at 40° C. for 164 hours, then tested for tensile strength, and compared to the set with no conditioning.
   FAS 454-98 Stiffness Modulus
   FAS 449-99 Determination of tensile strength from indirect tensile test
   FAS 446-01 Determination of water sensitivity of bituminous specimens using indirect tensile test.

From the results in Table 8, it can be seen that an asphalt mixture according to the present invention (1a) provides a lower degree of deformation and a higher stiffness modulus compared to an asphalt mixture comprising a prior art additive (1c), and the indirect tensile strengths and the indirect tensile strength ratio are also improved with the present invention.

TABLE 8

Asphalt samples data from performance testing properties

| | Asphalt specimen | | |
|---|---|---|---|
| | 1a | 1c (comparison) | 1d (comparison) |
| Air voids (vol %) | 4.5 | 4.3 | 4.3 |
| Deformation (mm) | 8.0 | 9.2 | 6.7 |
| Stiffness modulus - wet (Mpa) | 7496 | 7826 | 7411 |
| Stiffness modulus - dry (Mpa) | 7096 | 6641 | 7758 |
| ITS - wet (kPa) | 2123 | 1947 | 1274 |
| ITS - dry (kpa) | 2252 | 2107 | 2040 |
| ITSR (%) | 94 | 92 | 62 |

The invention claimed is:

1. A composition which is not a bitumen-in-water emulsionl comprising
   a) bitumen, and
   b) a compound according to formula (I)

wherein
   $R^1$ is $C_{1-6}$ hydrocarbyl or a group $C_{1-6}$ hydrocarbyl-N$(R^4)$—$(CH_2)_n$—;
   each one of $R^2$ and $R^3$ is independently a group —$(CH_2CH_2O)_p(CH_2CH(X)O)_q(CH_2CH_2O)_rR^5$;
   $R^4$ is methyl, ethyl or benzyl or a group —$(CH_2CH_2O)_p(CH_2CH(X)O)_q(CH_2CH_2O)_rR^5$;
   $R^5$ is independently H, —$R^6$ or —$C(O)R^6$, where $R^6$ is a $C_{1-6}$ hydrocarbyl;
   n is a value of from 2 to 4;
   X is methyl;
   Σp is a value of from 30 to 60;
   Σq is a value of from 10 to 100;
   Σr is a value of from 0 to 100;
   with the proviso that
      at least one of Σp and Σr is ≥35,
      an acid salt thereof, or the resulting compound from reacting a compound according to formula (I) with a quaternizing agent; and
   c) an anti-stripping agent different from the compound of formula (I) selected from the group consisting of fatty acid esters of quaternary alkanol amines, fatty amines, fatty polyamines, ethoxylated fatty amines, ethoxylated fatty polyamines, alkyl amido polyamines, alkyl imidazolines, alkyl imidazoline amines and alkyl imidazoline polyamines, and the products from the reaction between fatty acids or vegetable or animal oil and diethanolamine followed by the reaction with polyamines.

2. A composition according to claim 1, wherein $R^5$ is H.

3. A composition according to claim 1, wherein Σp is from 30 to 60, Σq is from 10 to 80, and Σr is 0.

4. A composition according to claim 1, wherein said anti-stripping agent is selected from the group consisting of $C_{6-30}$alkyl-imidazolines, $C_{6-30}$alkyl-imidazoline amines and $C_{6-30}$alkyl-imidazoline polyamines.

5. A composition according to claim 1, wherein b) and c) are present in a weight ratio of from 95:5 to 5:95.

6. A composition according to claim 1, wherein a) and b) are present in a weight ratio (a):(b) of from 99.9:0.1 to 95:5.

7. A composition according to claim 1, wherein a) and b) together constitutes at least 50 wt % based on the total weight of the composition.

8. A composition according to claim 1, further comprising d) aggregates.

9. A method for arranging a paving on a surface, comprising the steps of
   providing a composition according to claim 8;
   laying down a layer of said composition on a surface; and compacting said layer.

10. A composition according to claim 8, comprising from 1 to 15 wt % of the total of a), b) and c), and from 75 to 99 wt % of d), based on the weight of the total composition.

11. A composition according to claim 1, comprising less than 10 wt % water, based on the total weight of a) and b) in the composition.

12. A method of producing a composition according to claim 1, comprising
   providing bitumen;
   adding to said bitumen a compound of formula (I) as defined in claim 1 or an acid salt thereof, or the resulting compound from reacting a compound of formula (I) with a quaternizing agent, and,
   an anti-stripping agent different from the compound or formula (I), which anti-stripping agent is selected from the group consisting of fatty acid esters of quaternary alkanol amines, fatty amines, fatty polyamines, ethoxylated fatty amines, ethoxylated fatty polyamines, alkyl amido polyamines, alkyl imidazolines, alkyl imidazoline amines and alkyl imidazoline polyamines, the products from the reaction between fatty acids or vegetable or animal oil and diethanolamine followed by the reaction with polyamines, to form a bituminous binder composition and mixing said bituminous binder composition with aggregates.

13. A composition according to claim 1, wherein a), b) and c) are present in a weight ratio (a):(b+c) of from 99.9:0.1 to 95:5.

14. A composition according to claim 1, wherein a), b) and c) together constitutes at least 50 wt % based on the total weight of the composition.

15. A composition according to claim 1, comprising less than 10 wt % water, based on the total weight of a), b) and c) in the composition.

* * * * *